US012007852B2

(12) United States Patent
Yadav et al.

(10) Patent No.: US 12,007,852 B2
(45) Date of Patent: Jun. 11, 2024

(54) SYSTEMS AND METHODS FOR BACKING UP CLUSTERED AND NON-CLUSTERED DATA

(71) Applicant: Dell Products L.P., Round Rock, TX (US)

(72) Inventors: Sunil Yadav, Bangalore (IN); Shelesh Chopra, Bangalore (IN); Preeti Varma, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 65 days.

(21) Appl. No.: 17/872,647

(22) Filed: Jul. 25, 2022

(65) Prior Publication Data
US 2024/0028477 A1    Jan. 25, 2024

(51) Int. Cl.
*G06F 11/14* (2006.01)
(52) U.S. Cl.
CPC ...... *G06F 11/1464* (2013.01); *G06F 11/1461* (2013.01); *G06F 2201/84* (2013.01)
(58) Field of Classification Search
CPC ............. G06F 11/1464; G06F 11/1461; G06F 2201/84
See application file for complete search history.

(56) References Cited

U.S. PATENT DOCUMENTS

| | | | |
|---|---|---|---|
| 7,549,037 B1 | 6/2009 | Kale | |
| 8,069,366 B1 | 11/2011 | Wenzel | |
| 8,225,057 B1 | 7/2012 | Zheng | |
| 8,473,463 B1 | 6/2013 | Wilk | |
| 8,595,454 B1 | 11/2013 | Nagarkar | |
| 9,021,296 B1 | 4/2015 | Kiselev | |
| 9,077,580 B1 | 7/2015 | Randhawa et al. | |
| 9,268,784 B1 | 2/2016 | Guo et al. | |
| 9,398,092 B1 | 7/2016 | Singhal et al. | |
| 9,501,544 B1 | 11/2016 | Singhal et al. | |
| 9,535,907 B1 | 1/2017 | Stringham | |
| 9,934,107 B1 | 4/2018 | Chikkanayakanahally et al. | |
| 10,108,502 B1 | 10/2018 | Gopinath et al. | |
| 10,289,441 B1 | 5/2019 | Chopra et al. | |
| 10,740,005 B1 | 8/2020 | Ives et al. | |
| 10,860,427 B1 | 12/2020 | Chakraborty | |

(Continued)

OTHER PUBLICATIONS

PowerProtect Data Manager 19.9, Administration and User Guide, Dell EMC, Jan. 2022 rev. 02, (272 pages).

(Continued)

*Primary Examiner* — Nadeem Iqbal
(74) *Attorney, Agent, or Firm* — Chamberlain, Hrdlicka, White, Williams & Aughtry; Aly Z. Dossa

(57) ABSTRACT

A method for backing up standalone data and clustered data on a node, that includes receiving, by a backup agent, a first backup request, making a first determination that a backup process is not active, and based on the first determination, identifying a first type of data specified in the first backup request, where the first type of data is the standalone data, locating, using a first backup policy, the standalone data in the node, begin generating standalone backup data from the standalone data, receiving, by the backup agent, a second backup request, making a second determination that the backup process is active, and based on the second determination, queuing the second backup request.

20 Claims, 4 Drawing Sheets

(56) References Cited

U.S. PATENT DOCUMENTS

| | | |
|---|---|---|
| 10,936,545 B1 | 3/2021 | Chockalingam et al. |
| 11,048,591 B1 | 6/2021 | Mamidi |
| 2003/0163495 A1 | 8/2003 | Lanzatella |
| 2003/0221074 A1 | 11/2003 | Satoyama |
| 2008/0059721 A1 | 3/2008 | Turner et al. |
| 2009/0177856 A1* | 7/2009 | Herne ................ G06F 11/1464 |
| | | 711/E12.001 |
| 2012/0117028 A1 | 5/2012 | Gold et al. |
| 2014/0229695 A1 | 8/2014 | Dinkar |
| 2016/0034366 A1 | 2/2016 | Anglin |
| 2016/0048430 A1 | 2/2016 | Bolik |
| 2016/0203054 A1 | 7/2016 | Zhang |
| 2018/0300206 A1 | 10/2018 | Dai et al. |
| 2019/0377643 A1 | 12/2019 | Zhang |
| 2021/0034709 A1 | 2/2021 | Patwardhan |
| 2021/0055996 A1* | 2/2021 | Owens ................ G06F 11/1448 |
| 2021/0081287 A1 | 3/2021 | Koning et al. |

OTHER PUBLICATIONS

Dell PowerStore: Clustering and High Availability, White Paper, Dell Technologies, Jul. 2022 (45 pages).

\* cited by examiner

SYSTEMS AND METHODS FOR BACKING UP CLUSTERED AND NON-CLUSTERED DATA

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

DETAILED DESCRIPTION

Figure 1:
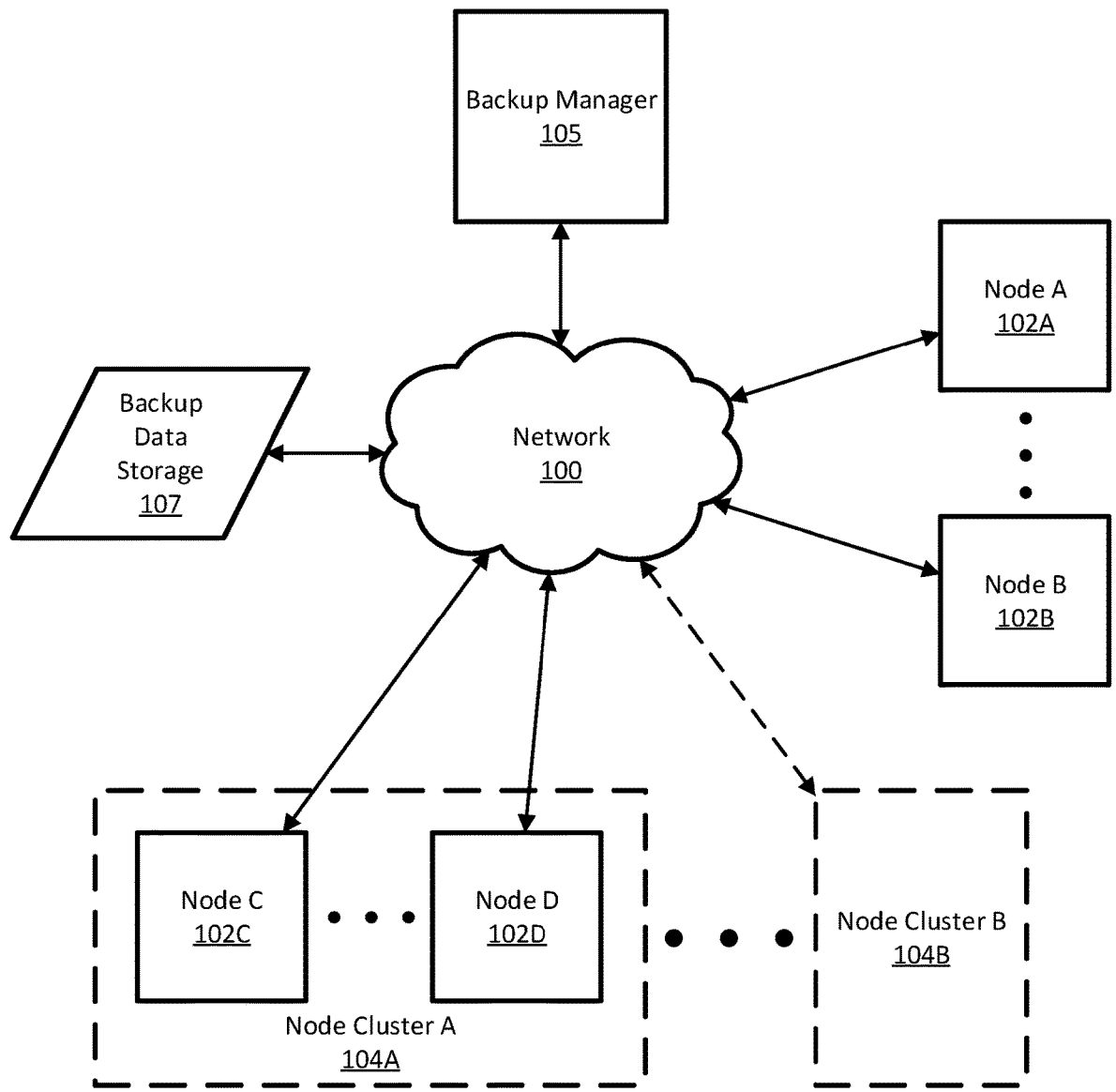
FIG. 1 shows a diagram of system, in accordance with one or more embodiments.

In general, embodiments relate to methods and systems for backing up clustered data and non-clustered (i.e., "stand-alone") data on one or more node(s). In conventional systems, an ongoing backup process may conflict with a second, concurrently active backup process if both of the backup processes are attempting to copy the same data, or one backup process makes data unavailable to the other backup process. In such instances, one or more backup process(es) may fail and, upon reattempting the backup process(es), they may fail again for the same reasons. One potential solution to such an issue may be to queue the backup requests—in the external backup manager that sends the backup requests to the node—and send each backup request after the previous backup operation is completed. However, the external backup manager may not be configured to know the status of the backup process(es) active on the node(s). Accordingly, the backup manager may not be configured to properly send the backup requests as the queue dictates. Further, the backup manager may be ill-equipped to discriminate between non-clustered data (i.e., standalone data that only one node needs) and clustered data (i.e., data that is shared and/or otherwise depended on by two or more nodes).

As disclosed herein, one or more methods for backing up data on a node includes performing one or more backup operations that divides data into "clustered" data and "non-clustered" (i.e., "standalone") data. Using such methods, concurrent backup processes of standalone data may be performed on each node individually (as those backup operations do not conflict). Then, the clustered data may be backup up via the node that primarily hosts the clustered data, thereby avoiding each node needlessly backing up duplicative clustered data. As a non-limiting example, in a system with five nodes, where each node includes independent "non-clustered" (standalone) data, each of the five nodes may begin performing a backup of the standalone data concurrently as the standalone data on each node is entirely independent of the data on the other nodes. Further, while the backup process is ongoing, the node is able to receive the backup request for clustered data. However, instead of beginning the clustered data backup process upon receipt of the request, each node may queue the backup request and wait until the active backup process concludes before beginning the next backup process. Accordingly, as each backup process runs sequentially on each node, and backup processes across nodes do not request the same data, no conflict between backup processes occur and each may complete without such errors.

Specific embodiments will now be described with reference to the accompanying figures. In the following description, numerous details are set forth as examples of one or more embodiments. One of ordinary skill in the art, having the benefit of this detailed description, would appreciate that one or more embodiments in this disclosure may be practiced without the specific details disclosed and that numerous variations or modifications may be possible and still remain in the scope of this detailed description. Certain details, known to those of ordinary skill in the art, may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired connection or wireless connection directly between two devices) or indirect (e.g., wired and/or wireless connections between any number of devices connecting the operatively connected devices) connection.

As used herein, the adjectives "source", "destination", and "intermediate" are for explanatory purposes only. That is, the components, devices, and collections of devices described using these adjectives are meant only to provide a better understanding to the reader in the context of a particular scenario—not to generally limit the capabilities of those components, devices, and collections of devices. As an example, a "component" may perform certain operation when acting as a "source component" and may perform some of the same and other operations when acting as a "destination component". However, each "component" (whether it be "source" or "destination") may be fully capable of performing the operations of either role.

As used herein, the word "data" is treated as an "uncountable" singular noun—not as the plural form of the singular noun "datum". Accordingly, throughout the application, "data" is paired with a singular verb when written (e.g., "data is"). However, this usage should not be interpreted to redefine "data" to exclusively mean a single bit of information. Rather, as used herein, "data" means any one or more bit(s) of information that are logically and/or physically grouped. Further, "data" may be used as a plural noun if context provides the existence of multiple "data" (e.g., "two data are combined").

FIG. 1 shows a diagram of system, in accordance with one or more embodiments. In one or more embodiments, the system includes a network (100) operatively connected to one or more node(s) (102), a backup manager (105), and backup data storage (107). Further, the node(s) (102) may be organized into one or more node cluster(s) (104). Each of these components is described below.

In one or more embodiments, a computing device is hardware that includes one or more processor(s), memory (volatile and/or non-volatile), persistent storage, internal physical interface(s) (e.g., serial advanced technology attachment (SATA) ports, peripheral component interconnect (PCI) ports, PCI express (PCIe) ports, next generation form factor (NGFF) ports, M.2 ports, etc.), external physical interface(s) (e.g., universal serial bus (USB) ports, recommended standard (RS) serial ports, audio/visual ports, etc.), communication interface(s) (e.g., network ports, small form-factor pluggable (SFP) ports, wireless network devices, etc.), input and output device(s) (e.g., human interface devices), or any combination thereof. Further, in one or more embodiments, the persistent storage (and/or memory) of the computing device may store computer instructions (e.g., computer code) which, when executed by the processor(s) of the computing device (e.g., as software), cause the computing device to perform one or more processes specified in the computer instructions. Non-limiting examples of a computing device include a network device (e.g., switch, router, multi-layer switch, etc.), a server (e.g., a blade-server in a blade-server chassis, a rack server in a rack, etc.), a personal computer (e.g., desktop, laptop, tablet, smart phone, personal digital assistant), and/or any other type of computing device with the aforementioned capabilities.

In one or more embodiments, a network (e.g., network (100)) is a collection of connected network devices (not shown) that allow for the communication of data from one network device (not shown) to other network devices (not shown), or the sharing of resources among network devices (not shown). Non-limiting examples of a network (e.g., network (100)) include a local area network (LAN), a wide area network (WAN) (e.g., the Internet), a mobile network, or any other type of network that allows for the communication of data and sharing of resources among network devices and/or devices operatively connected to the network (100). One of ordinary skill in the art, having the benefit of this detailed description, would appreciate that a network is a collection of operatively connected devices that enables communication between those devices.

In one or more embodiments, a node (e.g., node A (102A), node B (102B), node C (102C), node D (102D)) is a computing device. Additional details regarding nodes (102) may be found in the description of FIG. 2. In one or more embodiments, a node cluster (e.g., node cluster A (104A), node cluster B (104B)) is a collection of two or more operatively connected node(s) (102). Nodes (102) in a node cluster (104) may be operatively connected via a network (e.g., node C (102C) and node D (102D) in node cluster A (104A) are operatively connected via network (100)). Additionally, nodes (102) in a node cluster (104) may share resources (e.g., memory from other nodes (102)) and virtualized/logical resources may span across two or more nodes (102) (e.g., a unified logical storage volume using storage devices located in multiple nodes (102) in a node cluster (104)).

In one or more embodiments, a backup manager (e.g., backup manager (105)) is software executing on a computing device (i.e., a node (102), or some other computing device (not shown)). The backup manager (105) may initiate the generation of backup data (107) in one or more node(s) (102). In one or more embodiments, the backup manager (105) maintains a data structure—a "clustered data host node list" (not shown)— that indicates which nodes (102) are the "host" for each set of clustered data. Additional details regarding the operation of the backup manager (105) may be found in the description of FIG. 4.

In one or more embodiments, backup data storage (e.g., backup data storage (107)) is data copied from data on one or more node(s) (102). Backup data storage (107) may be stored on the same computing device (not shown) on which backup manager (105) is executing, or any other computing device. Additional details regarding backup data storage (107) may be found in the description of FIG. 3.

While FIG. 1 shows a specific configuration of a system, other configurations may be used without departing from the scope of the disclosed embodiments. Accordingly, embodiments disclosed herein should not be limited to the configuration of devices and/or components shown in FIG. 1.

Figure 2:
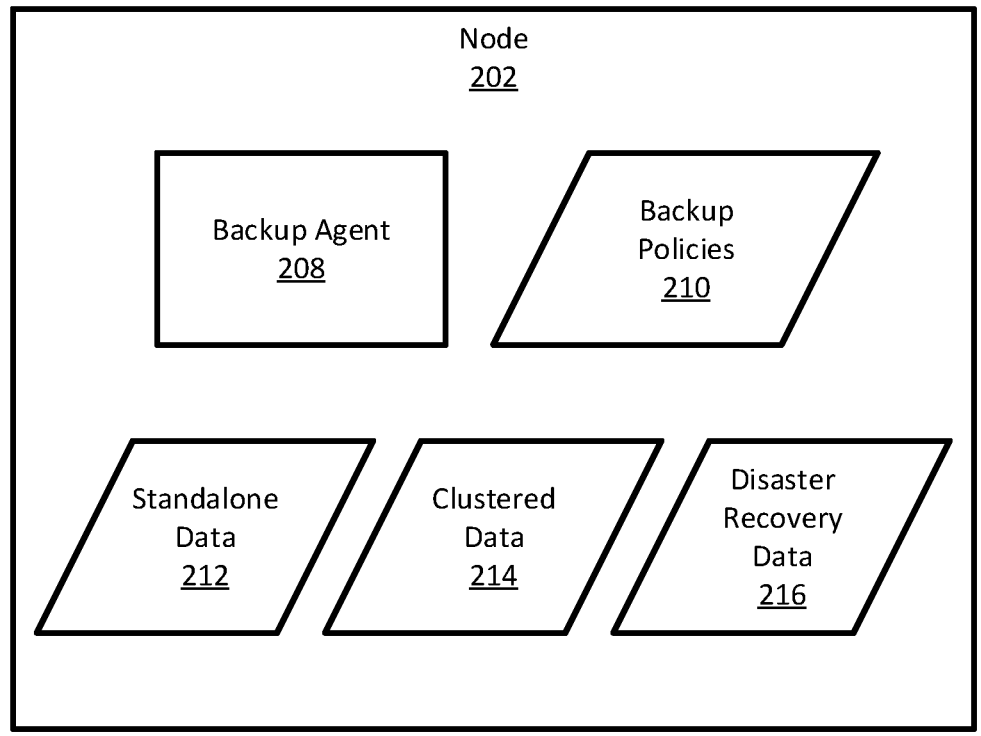
FIG. 2 shows a diagram of node, in accordance with one or more embodiments.

FIG. 2 shows a diagram of node, in accordance with one or more embodiments. In one or more embodiments, a node (202) includes a backup agent (208), backup policies (210), standalone data (212), and clustered data (214). Each of these components is described below.

In one or more embodiments, a backup agent (e.g., backup agent (208)) is software executing in the node (202) (e.g., in user space, in the operating system, in the kernel, etc.). A backup agent (208) is software, executing on the node (202) that initiates, coordinates, and/or otherwise controls the creation of backup data (those of FIG. 3) from the standalone data (212), clustered data (214), and disaster recovery data (216). Additional details regarding the operation of the backup agent (208) may be found in the description of FIG. 5.

In one or more embodiments, a backup policy (e.g., backup policies (210)) is a data structure that include one or more properties about a type of backup procedure. A backup policy (210) may include (i) an indication of the property type of data for a backup (e.g., standalone, clustered, disaster recovery), (ii) the location(s) of the type of data indicated (e.g., volumes, drives, file paths, filenames, memory addresses, etc.), (iii) whether, for clustered data (214), if the node (202) is the "cluster host" for clustered data shared across multiple nodes (i.e., if the node (202) is the primary and/or preferred "host" for maintaining and/or backing up the clustered data (214) on the node (202) and other node(s) (not shown)). In one or more embodiments, there may be a backup policy (210) for each type of type of data for a backup (e.g., one fore standalone data, one for clustered data, one for disaster recovery data).

In one or more embodiments, standalone data (e.g., standalone data (212)) is data that is exclusive to the node (202) on which the standalone data (212) resides. That is, as a non-limiting example, standalone data may include local-only operating system, configuration, and/or data files that are not necessary for the functioning of other node(s) (not shown). Further, in one or more embodiments, although standalone data (212) may be accessible by other node(s) (e.g., via a shared network volume), the standalone data (212) is not required by those other node(s) for functionality or operation. Accordingly, as another non-limiting example, if standalone data (212) were to be irreversibly lost, only the node (202) that includes the standalone data (212) would be affected.

In one or more embodiments, clustered data (e.g., clustered data (214)) is data that is part of a shared asset that, at least one other node (not shown) requires access to in order to operate and function. As a non-limiting example, clustered data (214) may include data that is part of a logical storage volume that includes clustered data (214) stored on two or more nodes (202, others). In such an instance, the loss of clustered data (214) on one node (202) may cause the clustered data (not shown) on a second node (not shown) to become unreadable and/or otherwise less useful (e.g., if clustered data (214) is part of a striped RAID array). As another non-limiting example, clustered data (214) may include shared configuration files that applications (not shown) executing on two or more nodes (202, others) use to initialize. In such an instance, loss of the clustered data (214) on the node (202) may cause an application (not shown) executing on another node (not shown) to fail to initialize and execute as desired.

In one or more embodiments, disaster recovery data (e.g., disaster recovery data (216)) is a collection of data designated as "critical" to the functioning of the node (e.g., the data required for the node to boot, an operating system (not shown) to initialize, and/or any other data required for the basic functionality of the node. In one or more embodiments, disaster recovery data (216) may be included in standalone data (212) and/or clustered data (214).

While FIG. 2 shows a specific configuration of a node, other configurations may be used without departing from the scope of the disclosed embodiments. Accordingly, embodiments disclosed herein should not be limited to the configuration of devices and/or components shown in FIG. 2.

Figure 3:
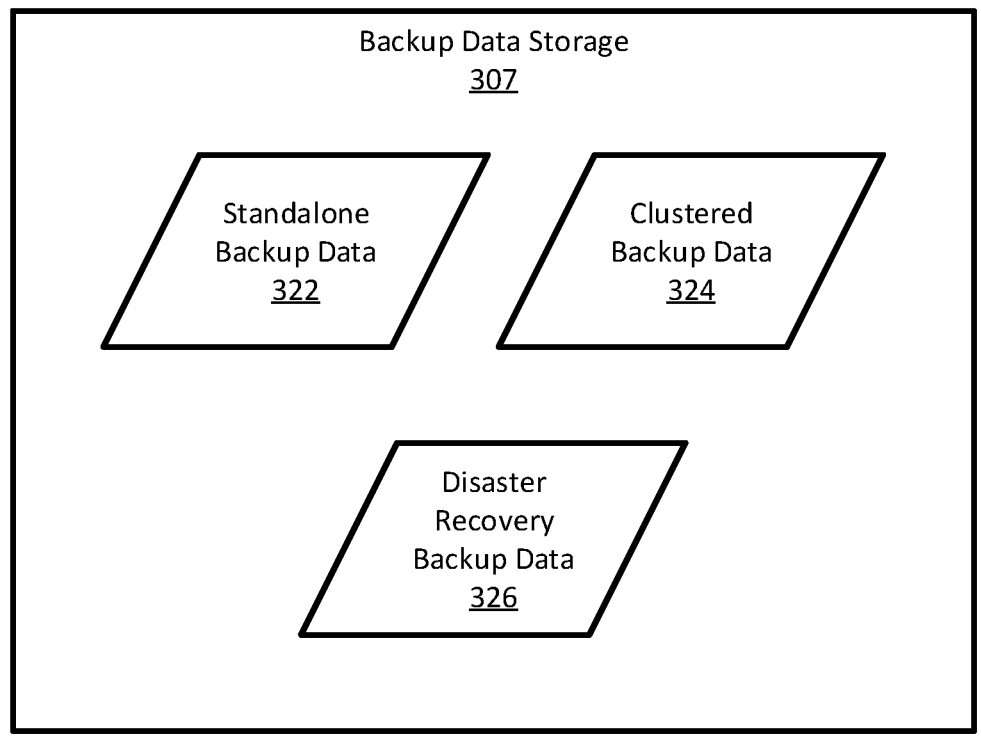
FIG. 3 shows a diagram of backup data storage, in accordance with one or more embodiments.

FIG. 3 shows a diagram of backup data storage, in accordance with one or more embodiments. In one or more embodiments, backup data storage (307) includes standalone backup data (322), clustered backup data (324), and disaster recovery backup data (326). Each of these components is described below.

Generally, in one or more embodiments, backup data (322, 324, 326) is a copy of source data (e.g., standalone data, clustered data, disaster recovery data, etc.). Backup data (322, 324, 326) may contain all of the same information as the source data, but is stored in a different physical location (e.g., elsewhere on the same disk, on a different disk in the same server, on a different disk in a different server, etc.). Further, backup data (322, 324, 326) may include additional data that was not part of the source data. As a non-limiting example, backup data (322, 324, 326) may include metadata that describes the backup data (322, 324, 326) and/or the source data, including information such as the date/time the backup data (322, 324, 326) was generated, the location of the source data, the type(s) of data included in the backup data (322, 324, 326), and/or any other relevant information.

In one or more embodiments, backup data (322, 324, 326) may be a copy of the source data, as that source data existed at one point in time (e.g., a snapshot). That is, as a non-limiting example, backup data (322, 324, 326) may be generated at discrete points in time (e.g., every minute, hour, day, month, etc.) and otherwise remain static while the source data is modified after the backup data (322, 324, 326) is generated. Alternatively, as another non-limiting example, backup data (322, 324, 326) may be generated concurrently with the source data (e.g., a mirror), where all modifications made the source data are simultaneously made to the backup data (322, 324, 326).

In one or more embodiments, standalone backup data (e.g., standalone backup data (322)) is backup data of standalone data. In one or more embodiments, clustered backup data (e.g., clustered backup data (324)) is backup data of the clustered data. And, in one or more embodiments, disaster recovery backup data (e.g., disaster recovery backup data (326)) is backup data of disaster recovery data.

While FIG. 3 shows a specific configuration of a backup data storage, other configurations may be used without departing from the scope of the disclosed embodiments. Accordingly, embodiments disclosed herein should not be limited to the configuration of devices and/or components shown in FIG. 3.

Figure 4:
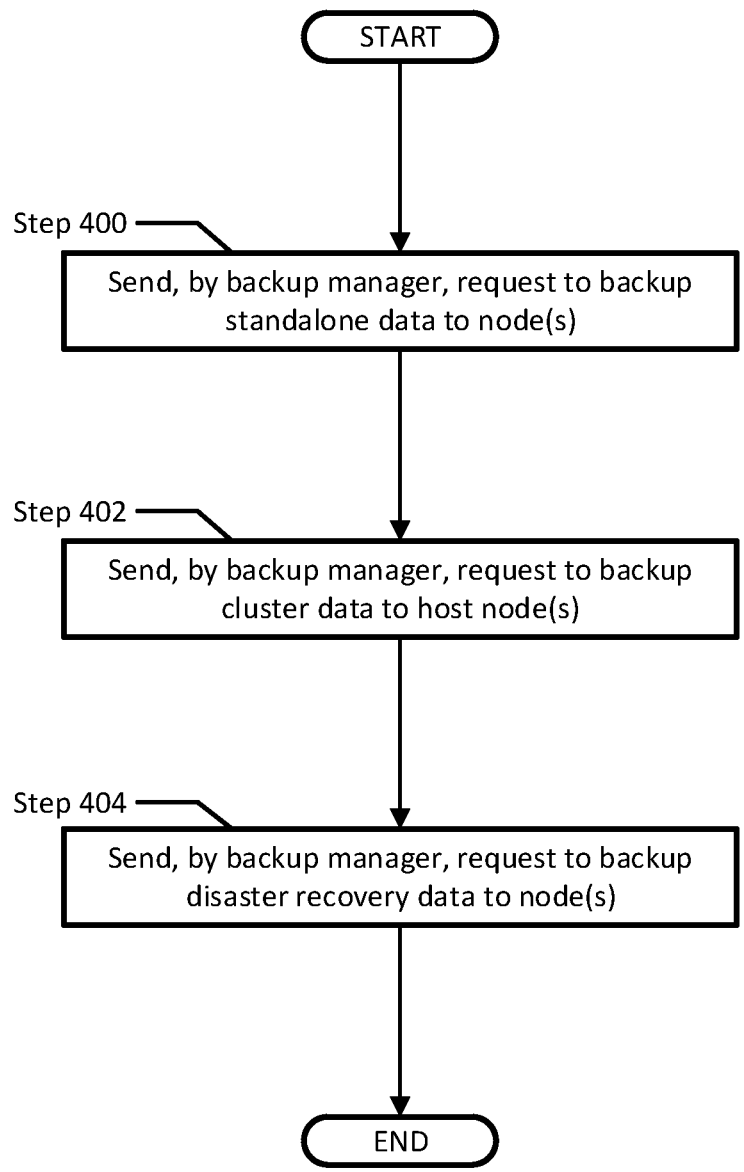
FIG. 4 shows a flowchart of a method of initiating generation of backup data, in accordance with one or more embodiments.

FIG. 4 shows a flowchart of a method of initiating generation of backup data, in accordance with one or more embodiments. All or a portion of the method shown may be performed by one or more components of the backup manager. However, another component of the system may perform this method without departing from the embodiments disclosed herein. While the various steps in this flowchart are presented and described sequentially, one of ordinary skill in the relevant art will appreciate that some or all of the steps may be executed in different orders, combined, or omitted, and some or all steps may be executed in parallel.

In Step 400, the backup manager sends a backup request to one or more node(s) to generate standalone backup data from the standalone data on the node(s). In one or more embodiments, the backup request to generate standalone backup data may include a property specifying the type of data that is to be backed up (e.g., "standalone").

In Step 402, the backup manager sends a backup request to one or more host node(s) to generate clustered backup data from the clustered data on the node(s). In one or more embodiments, the backup request to generate clustered backup data may include a property specifying the type of data that is to be backed up (e.g., "clustered").

As discussed in the description of FIG. 1, the backup manager maintains a "clustered data host node list" that indicates which nodes are the "host" for each set of clustered data. Accordingly, the backup manager may only send a backup request to generate clustered backup data to node(s) that are indicated as a "host" for the clustered data specified. The backup agent may perform a lookup in the "clustered data host node list" and identify which nodes are designated as hosts (and for which clustered data). The backup manager then sends the backup requests only to the identified node(s) hosting the clustered data.

In Step 404, the backup manager sends a backup request to one or more node(s) to generate disaster recovery backup data from the node(s). In one or more embodiments, the backup request to generate disaster recovery backup data may include a property specifying the type of data that is to be backed up (e.g., "disaster"). The process may end following Step 404.

In one or more embodiments, the backup manager may send each request at once, in short succession, on a schedule, when initiated by a user, and/or any other action that may initiate a backup request to be sent. That is, as a non-limiting example, the backup manager may send all three requests (Steps 402, 402, 404) at the same time (e.g., in a single message). As another non-limiting example, the backup manager may send the cluster backup request (Step 402) shortly after sending the standalone backup request (Step 400), before any node could have completed generating the standalone backup data. In such instances, the backup agent (on the node) may be configured to queue any backup requests until the current backup operation is completed. Further, as another non-limiting example, requests to generate standalone backup data may be sent on Mondays, requests to generate clustered backup data may be sent on Wednesdays, and requests to generate disaster recovery backup data may be sent on Fridays. In one or more embodiments, the backup manager may send the backup request(s) to two or more nodes concurrently. Further, the backup request(s) may be sent by the backup manager to one or more node(s) over a network (or series of networks).

Figure 5:
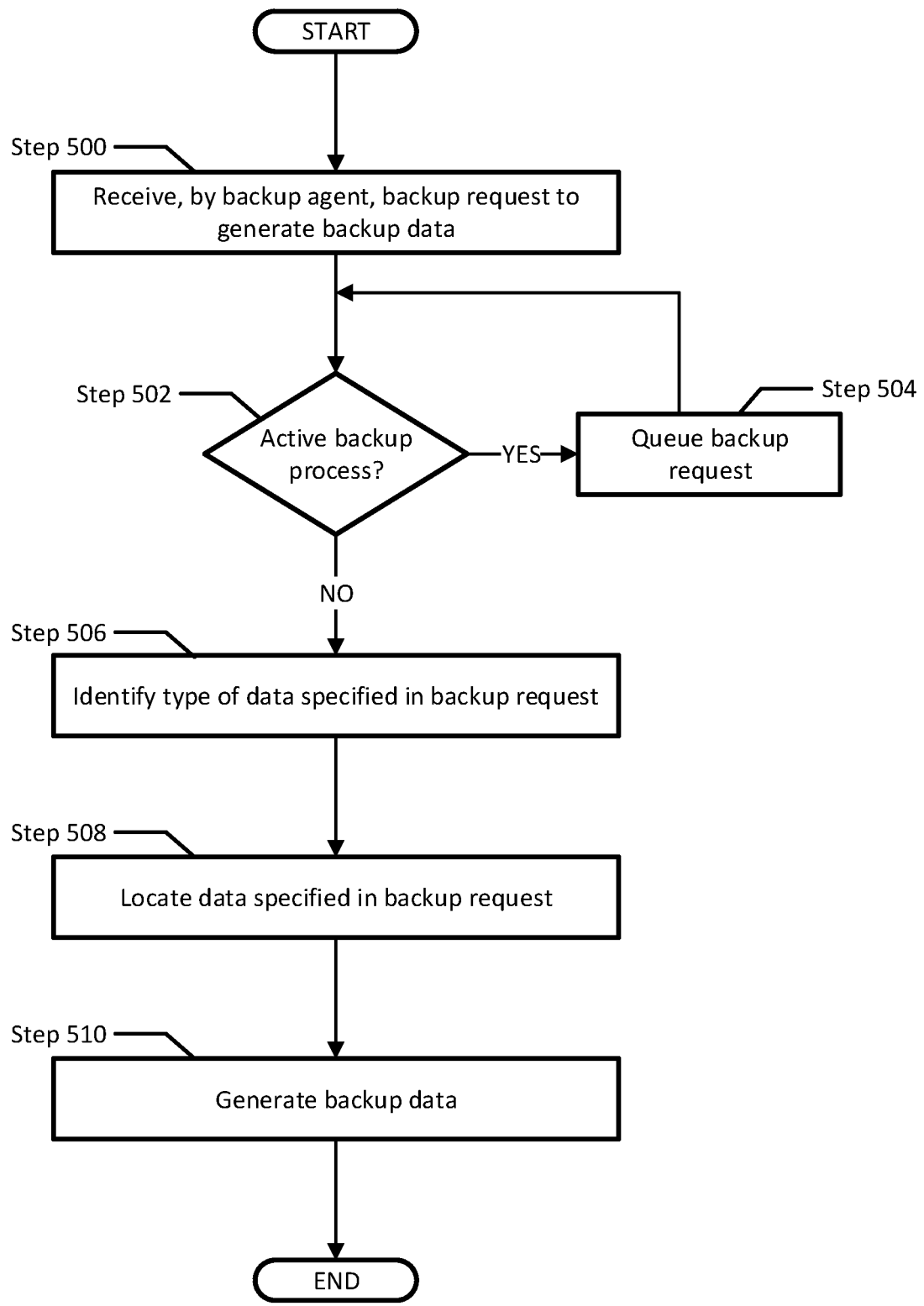
FIG. 5 shows a flowchart of a method of generating backup data, in accordance with one or more embodiments.

FIG. 5 shows a flowchart of a method of generating backup data, in accordance with one or more embodiments. All or a portion of the method shown may be performed by one or more components of the backup agent executing on a node. However, another component of the system may perform this method without departing from the embodiments disclosed herein. While the various steps in this flowchart are presented and described sequentially, one of ordinary skill in the relevant art will appreciate that some or all of the steps may be executed in different orders, combined, or omitted, and some or all steps may be executed in parallel.

In Step 500, the backup agent receives a backup request to generate backup data. The backup request may be received over a network (or series of networks) to which the node and the backup manager are both operatively connected.

In Step 502, the backup agent makes a determination as to whether there is an active backup process or nor (i.e., if a backup process is currently in progress). In one or more embodiments, the backup agent may determine if a backup process is active by performing a lookup in a list of active processes to identify the existence (or non-existence) of an active backup process.

If the backup agent makes a determination that a backup process is in progress (Step 502-YES), the method proceeds to Step 504. However, if the backup agent makes a determination that a backup process is not in progress (Step 502-NO), the method proceeds to Step 506.

In Step 504, the backup agent queues the backup request (the backup request received in Step 500). In one or more embodiments, the backup agent may only perform one backup operation at a time (i.e., backup operations must be performed sequentially and not concurrently). Accordingly, if a request to generate backup data is received while the node is already in the process of generating backup data (Step 502-YES), the newly received backup request is placed at the bottom of queue (e.g., first-in-first-out) such that each backup operation is performed in the order the node received the associated backup request.

In Step 506, the backup agent identifies the type of data specified in the backup request. In one or more embodiments, the backup request, sent by the backup manager, may include a property indicating the type of data to be backed up (e.g., standalone, clustered, disaster, etc.) and the backup agent may use that property to identify the type of data to be backed up.

In Step 508, the backup agent locates the data to be backed up based on the type of data specifies in the backup request. In one or more embodiments, the backup agent performs a lookup in the backup policies to locate the data matching the type specified in the backup request.

As a non-limiting example, if the backup request (received in Step 500) specifies "standalone" data, the backup policies include a backup policy that specifies which data on the node is considered "standalone" (and the respective location of that standalone data).

As another non-limiting example, if the backup request (received in Step 500) specifies "clustered" data, the backup policies include a backup policy that specifies which data on the node is considered "clustered" (and the respective location of that clustered data). In one or more embodiments, the node that is designated as the "host" for the clustered data (the node that receives a backup request for clustered data) also backs up the clustered data on other nodes (those not designated as "host"). Accordingly, the locations specified in the backup policy may include addresses (or volumes generally) where the data is located on other nodes.

Further, in one or more embodiments, if a node is not considered a "host" node for clustered data stored thereon, the node may be requested to send (i.e., copy) the data to a requesting host node for a backup process (e.g., the clustered data would be read/copied as is normally accessed).

As another non-limiting example, if the backup request (received in Step 500) specifies "disaster" data, the backup policies include a backup policy that specifies which data on the node is considered "disaster" (and the respective location of that disaster recovery data).

In Step 510, the backup agent generates the backup specified in the backup request. The backup agent generates the backup by initiating a series of copy commands to copy all of the data identified and located (in Steps 506 and 508) and write the copied to the backup data storage.

After Step 510, the backup agent performs a lookup, in the queue, to identify the next backup request to process (if present). If a backup request is present in the queue, the backup agent may repeat Steps 506, 508, and 510 for that queued backup request. In one or more embodiments, the backup requests in the queue may be processed in a first-in-first-out (FIFO) order.

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A method for backing up standalone data and clustered data on a node, comprising:
   receiving, by a backup agent, a first backup request;
   making a first determination that a backup process is not active; and
   based on the first determination:
   identifying a first type of data specified in the first backup request, wherein the first type of data is the standalone data;
   locating, using a first backup policy, the standalone data in the node;
   begin generating standalone backup data from the standalone data;

receiving, by the backup agent, a second backup request;
making a second determination that the backup process is active; and
based on the second determination:
queuing the second backup request.

2. The method of claim 1, wherein after queuing the second backup request, the method further comprises:
finish generating the standalone backup data;
making a third determination that the backup process is not active; and
based on the third determination:
identifying a second type of data specified in the second backup request, wherein the second type of data is the clustered data;
locating, using a second backup policy, the clustered data in the node; and
begin generating clustered backup data from the clustered data.

3. The method of claim 2, wherein after beginning to generate the clustered backup data, the method further comprises:
receiving, by the backup agent, a third backup request;
making a fourth determination that the backup process is active; and
based on the fourth determination:
queuing the third backup request.

4. The method of claim 3, wherein after queuing the third backup request, the method further comprises:
finish generating the clustered backup data;
making a fifth determination that the backup process is not active; and
based on the fifth determination:
identifying a third type of data specified in the third backup request, wherein the third type of data is disaster recovery data.

5. The method of claim 4, wherein after identifying the third type of data specified in the third backup request, the method further comprises:
locating, using a third backup policy, the disaster recovery data in the node; and
generating disaster recovery backup data from the disaster recovery data.

6. The method of claim 1, wherein after queuing the second backup request, the method further comprises:
finish generating the standalone backup data;
making a third determination that the backup process is not active; and
based on the third determination:
identifying a second type of data specified in the second backup request, wherein the second type of data is disaster recovery data;
locating, using a second backup policy, the disaster recovery data in the node; and
generating disaster recovery backup data from the disaster recovery data.

7. The method of claim 6, wherein after generating the disaster recovery backup data, the method further comprises:
receiving a request to copy the clustered data to a second node.

8. A non-transitory computer readable medium comprising instructions which, when executed by a computer processor, enables the computer processor to perform a method for backing up standalone data and clustered data on a node, comprising:
receiving, by a backup agent, a first backup request;
making a first determination that a backup process is not active; and
based on the first determination:
identifying a first type of data specified in the first backup request, wherein the first type of data is the standalone data;
locating, using a first backup policy, the standalone data in the node;
begin generating standalone backup data from the standalone data;
receiving, by the backup agent, a second backup request;
making a second determination that the backup process is active; and
based on the second determination:
queuing the second backup request.

9. The non-transitory computer readable medium of claim 8, wherein after queuing the second backup request, the method further comprises:
finish generating the standalone backup data;
making a third determination that the backup process is not active; and
based on the third determination:
identifying a second type of data specified in the second backup request, wherein the second type of data is the clustered data;
locating, using a second backup policy, the clustered data in the node; and
begin generating clustered backup data from the clustered data.

10. The non-transitory computer readable medium of claim 9, wherein after beginning to generate the clustered backup data, the method further comprises:
receiving, by the backup agent, a third backup request;
making a fourth determination that the backup process is active; and
based on the fourth determination:
queuing the third backup request.

11. The non-transitory computer readable medium of claim 10, wherein after queuing the third backup request, the method further comprises:
finish generating the clustered backup data;
making a fifth determination that the backup process is not active; and
based on the fifth determination:
identifying a third type of data specified in the third backup request, wherein the third type of data is disaster recovery data.

12. The non-transitory computer readable medium of claim 11, wherein after identifying the third type of data specified in the third backup request, the method further comprises:
locating, using a third backup policy, the disaster recovery data in the node; and
generating disaster recovery backup data from the disaster recovery data.

13. The non-transitory computer readable medium of claim 8, wherein after queuing the second backup request, the method further comprises:
finish generating the standalone backup data;
making a third determination that the backup process is not active; and
based on the third determination:
identifying a second type of data specified in the second backup request, wherein the second type of data is disaster recovery data;

locating, using a third backup policy, the disaster recovery data in the node; and generating disaster recovery backup data from the disaster recovery data.

14. The non-transitory computer readable medium of claim 13, wherein after generating the disaster recovery backup data, the method further comprises:

receiving a request to copy the clustered data to a second node.

15. A node, comprising:

memory;

a storage device comprising standalone data and clustered data; and a processor executing a backup manager, wherein the backup manager is configured to perform a method for backing up the standalone data and the clustered data on the node, comprising:

receiving a first backup request;

making a first determination that a backup process is not active; and based on the first determination:

identifying a first type of data specified in the first backup request, wherein the first type of data is the standalone data;

locating, using a first backup policy, the standalone data in the node;

begin generating standalone backup data from the standalone data;

receiving a second backup request;

making a second determination that the backup process is active; and based on the second determination:

queuing the second backup request.

16. The node of claim 15, wherein after queuing the second backup request, the method further comprises:

finish generating the standalone backup data;

making a third determination that the backup process is not active; and based on the third determination:

identifying a second type of data specified in the second backup request, wherein the second type of data is the clustered data;

locating, using a second backup policy, the clustered data in the node; and begin generating clustered backup data from the clustered data.

17. The node of claim 16, wherein after beginning to generate the clustered backup data, the method further comprises:

receiving a third backup request;

making a fourth determination that the backup process is active; and based on the fourth determination:

queuing the third backup request.

18. The node of claim 17, wherein after queuing the third backup request, the method further comprises:

finish generating the clustered backup data;

making a fifth determination that the backup process is not active; and based on the fifth determination:

identifying a third type of data specified in the third backup request, wherein the third type of data is disaster recovery data.

19. The node of claim 18, wherein after identifying the third type of data specified in the third backup request, the method further comprises:

locating, using a third backup policy, the disaster recovery data in the node; and generating disaster recovery backup data from the disaster recovery data.

20. The node of claim 15, wherein after queuing the second backup request, the method further comprises:

finish generating the standalone backup data;

making a third determination that the backup process is not active; and based on the third determination:

identifying a second type of data specified in the second backup request, wherein the second type of data is disaster recovery data;

locating, using a third backup policy, the disaster recovery data in the node; and generating disaster recovery backup data from the disaster recovery data.

* * * * *